(12) United States Patent
Agarwal et al.

(10) Patent No.: US 11,726,927 B2
(45) Date of Patent: Aug. 15, 2023

(54) METHOD, APPARATUS, SYSTEM FOR EARLY PAGE GRANULAR HINTS FROM A PCIE DEVICE

(71) Applicant: Intel Corporation, Santa Clara, CA (US)

(72) Inventors: Ishwar Agarwal, Portland, OR (US); Rupin H. Vakharwala, Hillsboro, OR (US); Rajesh M. Sankaran, Portland, OR (US); Stephen R. Van Doren, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 17/827,458

(22) Filed: May 27, 2022

(65) Prior Publication Data
US 2022/0365887 A1 Nov. 17, 2022

Related U.S. Application Data

(63) Continuation of application No. 15/721,777, filed on Sep. 30, 2017, now Pat. No. 11,347,662.

(51) Int. Cl.
| | |
|---|---|
| *G06F 13/16* | (2006.01) |
| *G06F 12/0862* | (2016.01) |
| *G06F 12/1009* | (2016.01) |
| *G06F 12/1045* | (2016.01) |
| *G06F 13/42* | (2006.01) |

(52) U.S. Cl.
CPC ........ *G06F 13/161* (2013.01); *G06F 12/0862* (2013.01); *G06F 12/1009* (2013.01); *G06F 12/1063* (2013.01); *G06F 13/1663* (2013.01); *G06F 13/4282* (2013.01); *G06F 2212/602* (2013.01); *G06F 2212/621* (2013.01); *G06F 2212/65* (2013.01); *G06F 2212/68* (2013.01); *G06F 2213/0026* (2013.01)

(58) Field of Classification Search
None
See application file for complete search history.

(56) References Cited

U.S. PATENT DOCUMENTS

| | | | |
|---|---|---|---|
| 7,631,128 B1 | 12/2009 | Sgrosso et al. | |
| 8,090,789 B1 | 1/2012 | O'Shea et al. | |
| 8,578,127 B2 | 11/2013 | Thatcher et al. | |
| 8,645,623 B1 | 2/2014 | O'Shea et al. | |
| 9,715,519 B2 | 7/2017 | Atkisson | |
| 9,996,484 B1* | 6/2018 | Davis | G06F 13/105 |
| 2006/0168407 A1 | 7/2006 | Stern | |
| 2011/0320666 A1 | 12/2011 | Gregg et al. | |
| 2015/0248366 A1 | 9/2015 | Bergsten et al. | |
| 2016/0041936 A1 | 2/2016 | Lee et al. | |
| 2018/0004703 A1* | 1/2018 | Sharma | G06F 13/4072 |

* cited by examiner

*Primary Examiner* — Michael Sun
(74) *Attorney, Agent, or Firm* — Alliance IP, LLC

(57) ABSTRACT

Aspects of the embodiments are directed to systems and methods for providing and using hints in data packets to perform memory transaction optimization processes prior to receiving one or more data packets that rely on memory transactions. The systems and methods can include receiving, from a device connected to the root complex across a PCIe-compliant link, a data packet; identifying from the received device a memory transaction hint bit; determining a memory transaction from the memory transaction hint bit; and performing an optimization process based, at least in part, on the determined memory transaction.

20 Claims, 11 Drawing Sheets

METHOD, APPARATUS, SYSTEM FOR EARLY PAGE GRANULAR HINTS FROM A PCIE DEVICE

CROSS-REFERENCES TO RELATED APPLICATIONS

This application is a continuation (and claims the benefit of priority under 35 U.S.C. § 120) of U.S. patent application Ser. No. 15/721,777, filed Sep. 30, 2017, and entitled "METHOD, APPARATUS, SYSTEM FOR EARLY PAGE GRANULAR HINTS FROM A PCIE DEVICE", the entirety of which application is incorporated by reference herein.

BACKGROUND

Modern server and client processing units can support a wide number of core & input/output (I/O) agents. Each core and I/O agent can vie for low latency and high bandwidth access to shared resources to achieve better performance characteristics. Such shared resources can include cache memory and storage.

BRIEF DESCRIPTION OF THE DRAWINGS

The figures may not be drawn to scale. Like reference numbers denote like elements across the different figures.

DETAILED DESCRIPTION

In the following description, numerous specific details are set forth, such as examples of specific types of processors and system configurations, specific hardware structures, specific architectural and micro architectural details, specific register configurations, specific instruction types, specific system components, specific measurements/heights, specific processor pipeline stages, and operation, etc. in order to provide a thorough understanding of the present invention. It will be apparent, however, to one skilled in the art that these specific details need not be employed to practice the present invention. In other instances, well known components or methods, such as specific and alternative processor architectures, specific logic circuits/code for described algorithms, specific firmware code, specific interconnect operation, specific logic configurations, specific manufacturing techniques and materials, specific compiler implementations, specific expression of algorithms in code, specific power down and gating techniques/logic and other specific operational details of computer system haven't been described in detail in order to avoid unnecessarily obscuring the present invention.

Although the following embodiments may be described with reference to energy conservation and energy efficiency in specific integrated circuits, such as in computing platforms or microprocessors, other embodiments are applicable to other types of integrated circuits and logic devices. Similar techniques and teachings of embodiments described herein may be applied to other types of circuits or semiconductor devices that may also benefit from better energy efficiency and energy conservation. For example, the disclosed embodiments are not limited to desktop computer systems or Ultrabooks™. And may be also used in other devices, such as handheld devices, tablets, other thin notebooks, systems on a chip (SOC) devices, and embedded applications. Some examples of handheld devices include cellular phones, Internet protocol devices, digital cameras, personal digital assistants (PDAs), and handheld PCs. Embedded applications typically include a microcontroller, a digital signal processor (DSP), a system on a chip, network computers (NetPC), set-top boxes, network hubs, wide area network (WAN) switches, or any other system that can perform the functions and operations taught below. Moreover, the apparatuses, methods, and systems described herein are not limited to physical computing devices, but may also relate to software optimizations for energy conservation and efficiency.

Figure 1:
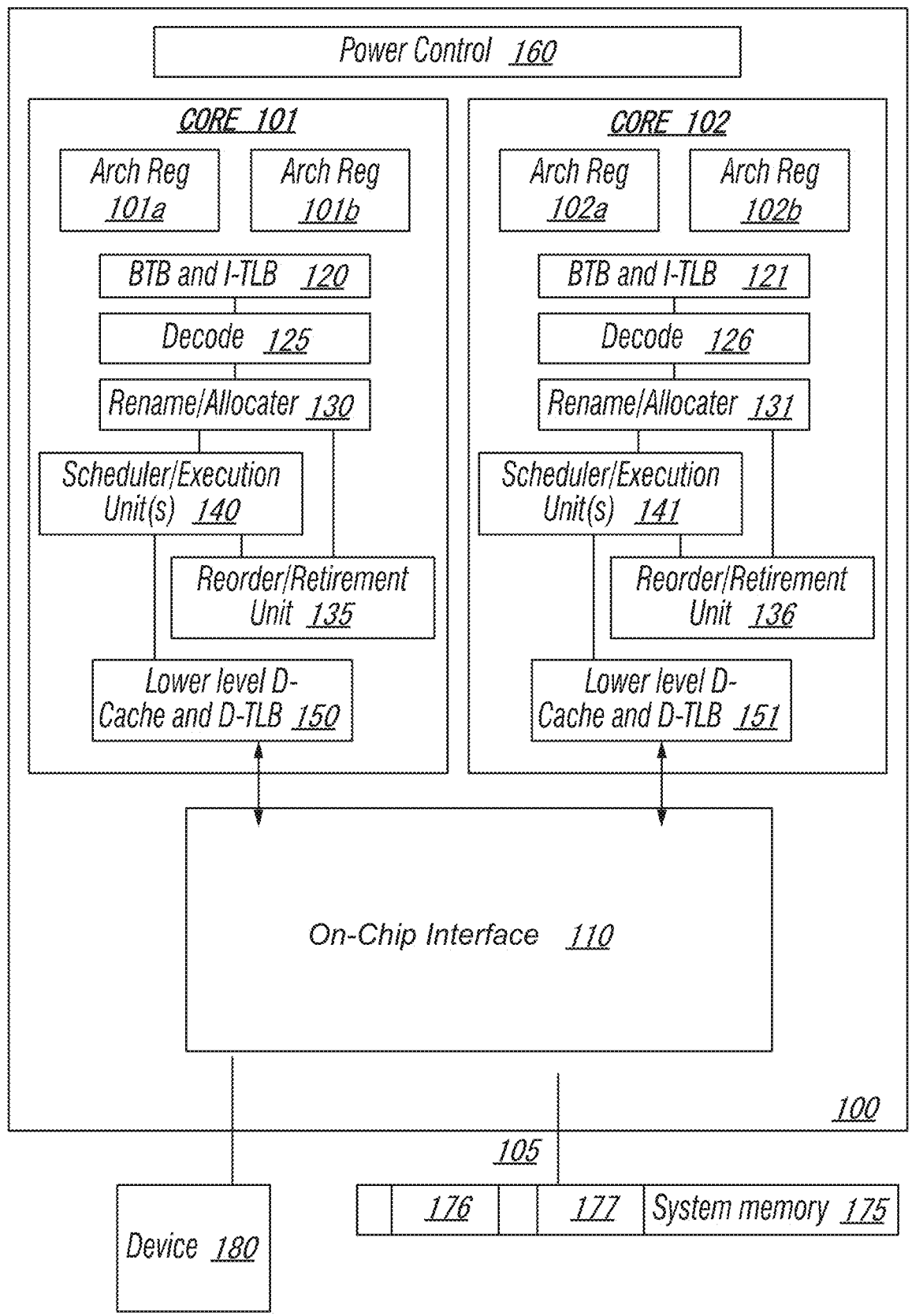
FIG. 1 illustrates an embodiment of a block diagram for a computing system including a multicore processor.

Referring to FIG. 1, an embodiment of a block diagram for a computing system including a multicore processor is depicted. Processor 100 includes any processor or processing device, such as a microprocessor, an embedded processor, a digital signal processor (DSP), a network processor, a handheld processor, an application processor, a co-processor, a system on a chip (SOC), or other device to execute code. Processor 100, in one embodiment, includes at least two cores—core 101 and 102, which may include asymmetric cores or symmetric cores (the illustrated embodiment). However, processor 100 may include any number of processing elements that may be symmetric or asymmetric.

In one embodiment, a processing element refers to hardware or logic to support a software thread. Examples of hardware processing elements include: a thread unit, a thread slot, a thread, a process unit, a context, a context unit, a logical processor, a hardware thread, a core, and/or any other element, which is capable of holding a state for a processor, such as an execution state or architectural state. In other words, a processing element, in one embodiment, refers to any hardware capable of being independently associated with code, such as a software thread, operating system, application, or other code. A physical processor (or processor socket) typically refers to an integrated circuit, which potentially includes any number of other processing elements, such as cores or hardware threads.

A core often refers to logic located on an integrated circuit capable of maintaining an independent architectural state, wherein each independently maintained architectural state is associated with at least some dedicated execution resources. In contrast to cores, a hardware thread typically refers to any logic located on an integrated circuit capable of maintaining an independent architectural state, wherein the independently maintained architectural states share access to execution resources. As can be seen, when certain resources are shared and others are dedicated to an architectural state, the line between the nomenclature of a hardware thread and core overlaps. Yet often, a core and a hardware thread are viewed by an operating system as individual logical processors, where the operating system is able to individually schedule operations on each logical processor.

Physical processor 100, as illustrated in FIG. 1, includes two cores—core 101 and 102. Here, core 101 and 102 are considered symmetric cores, i.e. cores with the same configurations, functional units, and/or logic. In another embodiment, core 101 includes an out-of-order processor core, while core 102 includes an in-order processor core. However, cores 101 and 102 may be individually selected from any type of core, such as a native core, a software managed core, a core adapted to execute a native Instruction Set Architecture (ISA), a core adapted to execute a translated Instruction Set Architecture (ISA), a co-designed core, or other known core. In a heterogeneous core environment (i.e. asymmetric cores), some form of translation, such a binary translation, may be utilized to schedule or execute code on one or both cores. Yet to further the discussion, the functional units illustrated in core 101 are described in further detail below, as the units in core 102 operate in a similar manner in the depicted embodiment.

As depicted, core 101 includes two hardware threads 101a and 101b, which may also be referred to as hardware thread slots 101a and 101b. Therefore, software entities, such as an operating system, in one embodiment potentially view processor 100 as four separate processors, i.e., four logical processors or processing elements capable of executing four software threads concurrently. As alluded to above, a first thread is associated with architecture state registers 101a, a second thread is associated with architecture state registers 101b, a third thread may be associated with architecture state registers 102a, and a fourth thread may be associated with architecture state registers 102b. Here, each of the architecture state registers (101a, 101b, 102a, and 102b) may be referred to as processing elements, thread slots, or thread units, as described above. As illustrated, architecture state registers 101a are replicated in architecture state registers 101b, so individual architecture states/contexts are capable of being stored for logical processor 101a and logical processor 101b. In core 101, other smaller resources, such as instruction pointers and renaming logic in allocator and renamer block 130 may also be replicated for threads 101a and 101b. Some resources, such as re-order buffers in reorder/retirement unit 135, ILTB 120, load/store buffers, and queues may be shared through partitioning. Other resources, such as general purpose internal registers, page-table base register(s), low-level data-cache and data-TLB 115, execution unit(s) 140, and portions of out-of-order unit 135 are potentially fully shared.

Processor 100 often includes other resources, which may be fully shared, shared through partitioning, or dedicated by/to processing elements. In FIG. 1, an embodiment of a purely exemplary processor with illustrative logical units/resources of a processor is illustrated. Note that a processor may include, or omit, any of these functional units, as well as include any other known functional units, logic, or firmware not depicted. As illustrated, core 101 includes a simplified, representative out-of-order (OOO) processor core. But an in-order processor may be utilized in different embodiments. The OOO core includes a branch target buffer 120 to predict branches to be executed/taken and an instruction-translation buffer (I-TLB) 120 to store address translation entries for instructions.

Core 101 further includes decode module 125 coupled to fetch unit 120 to decode fetched elements. Fetch logic, in one embodiment, includes individual sequencers associated with thread slots 101a, 101b, respectively. Usually core 101 is associated with a first ISA, which defines/specifies instructions executable on processor 100. Often machine code instructions that are part of the first ISA include a portion of the instruction (referred to as an opcode), which references/specifies an instruction or operation to be performed. Decode logic 125 includes circuitry that recognizes these instructions from their opcodes and passes the decoded instructions on in the pipeline for processing as defined by the first ISA. For example, as discussed in more detail below decoders 125, in one embodiment, include logic designed or adapted to recognize specific instructions, such as transactional instruction. As a result of the recognition by decoders 125, the architecture or core 101 takes specific, predefined actions to perform tasks associated with the appropriate instruction. It is important to note that any of the tasks, blocks, operations, and methods described herein may be performed in response to a single or multiple instructions; some of which may be new or old instructions. Note decoders 126, in one embodiment, recognize the same ISA (or a subset thereof). Alternatively, in a heterogeneous core environment, decoders 126 recognize a second ISA (either a subset of the first ISA or a distinct ISA).

In one example, allocator and renamer block 130 includes an allocator to reserve resources, such as register files to store instruction processing results. However, threads 101a and 101b are potentially capable of out-of-order execution, where allocator and renamer block 130 also reserves other resources, such as reorder buffers to track instruction results. Unit 130 may also include a register renamer to rename program/instruction reference registers to other registers internal to processor 100. Reorder/retirement unit 135 includes components, such as the reorder buffers mentioned above, load buffers, and store buffers, to support out-of-order execution and later in-order retirement of instructions executed out-of-order.

Scheduler and execution unit(s) block 140, in one embodiment, includes a scheduler unit to schedule instructions/operation on execution units. For example, a floating point instruction is scheduled on a port of an execution unit that has an available floating point execution unit. Register files associated with the execution units are also included to store information instruction processing results. Exemplary execution units include a floating point execution unit, an integer execution unit, a jump execution unit, a load execution unit, a store execution unit, and other known execution units.

Lower level data cache and data translation buffer (D-TLB) 150 are coupled to execution unit(s) 140. The data cache is to store recently used/operated on elements, such as data operands, which are potentially held in memory coherency states. The D-TLB is to store recent virtual/linear to physical address translations. As a specific example, a processor may include a page table structure to break physical memory into a plurality of virtual pages.

Here, cores 101 and 102 share access to higher-level or further-out cache, such as a second level cache associated with on-chip interface 110. Note that higher-level or further-out refers to cache levels increasing or getting further way from the execution unit(s). In one embodiment, higher-level cache is a last-level data cache—last cache in the memory hierarchy on processor 100—such as a second or third level data cache. However, higher level cache is not so limited, as it may be associated with or include an instruction cache. A trace cache—a type of instruction cache—instead may be coupled after decoder 125 to store recently decoded traces. Here, an instruction potentially refers to a macro-instruction (i.e. a general instruction recognized by the decoders), which may decode into a number of micro-instructions (micro-operations).

In the depicted configuration, processor 100 also includes on-chip interface module 110. Historically, a memory controller, which is described in more detail below, has been included in a computing system external to processor 100. In this scenario, on-chip interface 11 is to communicate with devices external to processor 100, such as system memory 175, a chipset (often including a memory controller hub to connect to memory 175 and an I/O controller hub to connect peripheral devices), a memory controller hub, a northbridge, or other integrated circuit. And in this scenario, bus 105 may include any known interconnect, such as multi-drop bus, a point-to-point interconnect, a serial interconnect, a parallel bus, a coherent (e.g. cache coherent) bus, a layered protocol architecture, a differential bus, and a GTL bus.

Memory 175 may be dedicated to processor 100 or shared with other devices in a system. Common examples of types of memory 175 include DRAM, SRAM, non-volatile memory (NV memory), and other known storage devices. Device 180 may include a graphic accelerator, processor or card coupled to a memory controller hub, data storage coupled to an I/O controller hub, a wireless transceiver, a flash device, an audio controller, a network controller, or other known device.

Recently however, as more logic and devices are being integrated on a single die, such as SOC, each of these devices may be incorporated on processor 100. For example in one embodiment, a memory controller hub is on the same package and/or die with processor 100. Here, a portion of the core (an on-core portion) 110 includes one or more controller(s) for interfacing with other devices such as memory 175 or a graphics device 180. The configuration including an interconnect and controllers for interfacing with such devices is often referred to as an on-core (or un-core configuration). As an example, on-chip interface 110 includes a ring interconnect for on-chip communication and a high-speed serial point-to-point link 105 for off-chip communication. Yet, in the SOC environment, even more devices, such as the network interface, co-processors, memory 175, graphics processor 180, and any other known computer devices/interface may be integrated on a single die or integrated circuit to provide small form factor with high functionality and low power consumption.

In one embodiment, processor 100 is capable of executing a compiler, optimization, and/or translator code 177 to compile, translate, and/or optimize application code 176 to support the apparatus and methods described herein or to interface therewith. A compiler often includes a program or set of programs to translate source text/code into target text/code. Usually, compilation of program/application code with a compiler is done in multiple phases and passes to transform hi-level programming language code into low-level machine or assembly language code. Yet, single pass compilers may still be utilized for simple compilation. A compiler may utilize any known compilation techniques and perform any known compiler operations, such as lexical analysis, preprocessing, parsing, semantic analysis, code generation, code transformation, and code optimization.

Larger compilers often include multiple phases, but most often these phases are included within two general phases: (1) a front-end, i.e. generally where syntactic processing, semantic processing, and some transformation/optimization may take place, and (2) a back-end, i.e. generally where analysis, transformations, optimizations, and code generation takes place. Some compilers refer to a middle, which illustrates the blurring of delineation between a front-end and back end of a compiler. As a result, reference to insertion, association, generation, or other operation of a compiler may take place in any of the aforementioned phases or passes, as well as any other known phases or passes of a compiler. As an illustrative example, a compiler potentially inserts operations, calls, functions, etc. in one or more phases of compilation, such as insertion of calls/operations in a front-end phase of compilation and then transformation of the calls/operations into lower-level code during a transformation phase. Note that during dynamic compilation, compiler code or dynamic optimization code may insert such operations/calls, as well as optimize the code for execution during runtime. As a specific illustrative example, binary code (already compiled code) may be dynamically optimized during runtime. Here, the program code may include the dynamic optimization code, the binary code, or a combination thereof.

Similar to a compiler, a translator, such as a binary translator, translates code either statically or dynamically to optimize and/or translate code. Therefore, reference to execution of code, application code, program code, or other software environment may refer to: (1) execution of a compiler program(s), optimization code optimizer, or translator either dynamically or statically, to compile program code, to maintain software structures, to perform other operations, to optimize code, or to translate code; (2) execution of main program code including operations/calls, such as application code that has been optimized/compiled; (3) execution of other program code, such as libraries, associated with the main program code to maintain software structures, to perform other software related operations, or to optimize code; or (4) a combination thereof.

Shared processor core fabrics attempt to balance traffic from I/O agents and rely on various techniques to optimize these competing accesses. To improve core performance, the fabric utilizes various methods including cache prefetch, differentiated caching policy, and memory bandwidth utilization optimizations, each of which may be based on predicting future core accesses based on current traffic pattern.

Hardware prefetch engines can help determine patterns and prefetch into a dedicated or a shared cache (mid-level cache or L2 cache or last level cache (LLC) prefetch). A hint or indication from the core itself on the traffic type can be used to aid in balancing competition for shared resources. Examples of such hints from the core include Dead Block Predictor, Non-Temporal hints, etc.

Characterizing I/O traffic into predictable patterns can be difficult because I/O traffic tends to have a wide variance depending on the type of device, application, and platform. I/O traffic also tends to not have non-uniform memory access (NUMA) affinity due to I/O and platform connectivity limitations. Thus, a hardware prefetch engine may suffer from inefficiency for I/O traffic. Also, unlike the core, I/O devices do not have a standard mechanism to send hints to the fabric to optimize for different traffic types. As a result, traditional methods for optimizing cache and memory bandwidth latency for cores have not been widely applicable to I/O.

This disclosure describes systems, methods, and devices to allow for I/O devices to send advance notice to the root complex on the nature of traffic that is about to be sourced from the device. The root complex can then use this information to make various decisions and optimizations about the traffic that it is expecting to receive. A PCIe connected device can provide a "hint" to the processor core as to the nature of the traffic that will be sources by the device. The processor core can use the hint to streamline the device's transaction with the shared resource.

Figure 2:
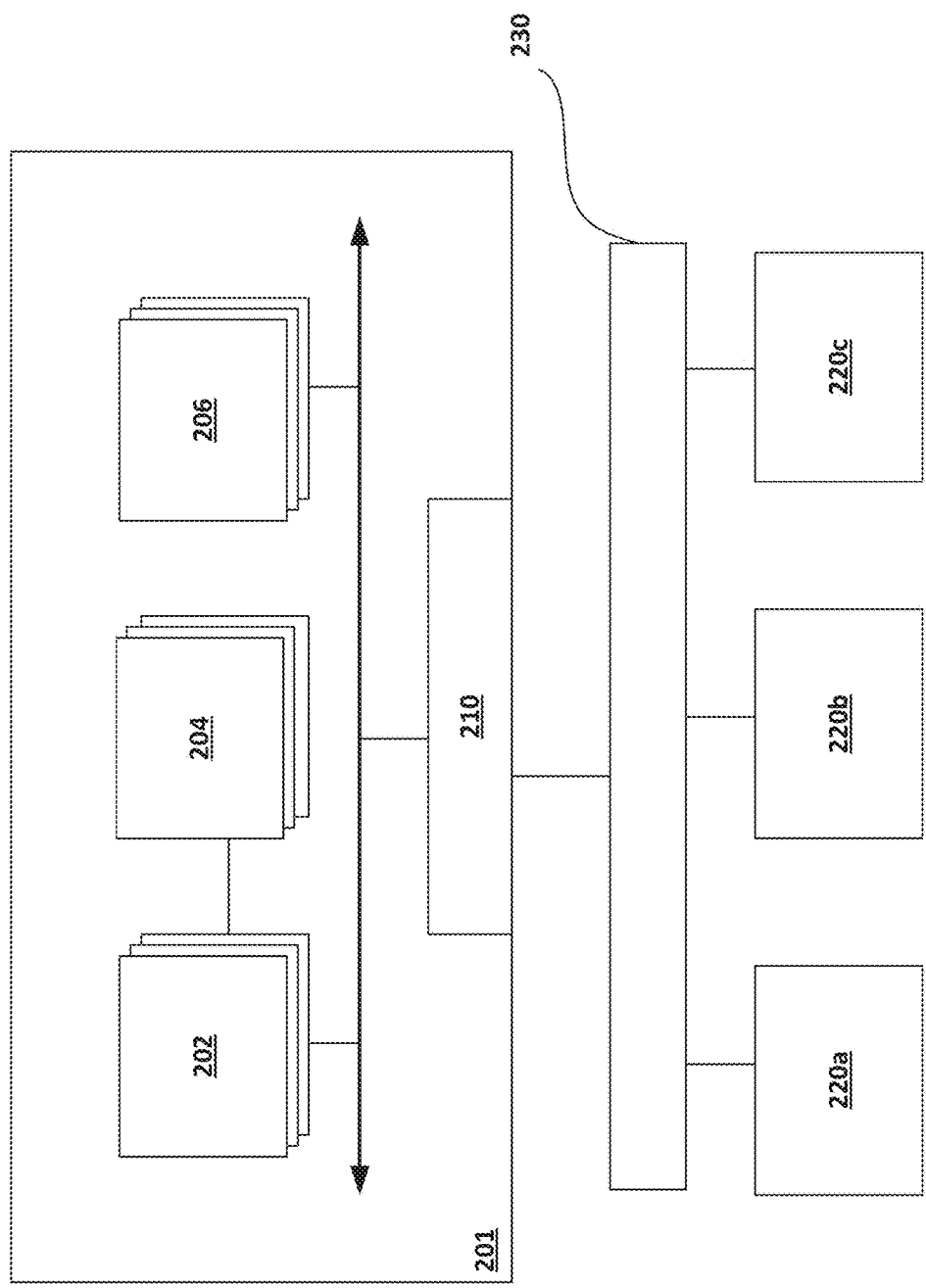
FIG. 2 is a schematic diagram of a system architecture 200 in accordance with embodiments of the present disclosure.

FIG. 2 is a schematic diagram of a system architecture 200 in accordance with embodiments of the present disclosure. The system architecture 200 can include a host system 201 and a plurality of devices 220a-c connected to the host system 201 through a PCIe-compliant switch fabric 230. The system architecture 200 can include one or more processors 202. The processors 202 can be coupled to the root complex by a link, such as a front-side bus. The processors 202 can include cache memory 204. The cache memory 204 can temporarily store data from storage 206.

The host system 201 can also include a root complex 210. Root complex 210 can act as a controller hub for PCIe-compliant systems and devices. The root complex 210 connects the processor 202 and storage 206 to the PCIe-complaint switch fabric 230 composed of one or more switch devices. The root complex 210 also connects devices 220a-c to the host system 201 through the switch fabric 230.

In embodiments, the devices 220a-c can compete for processing and memory resources hosted by the host system 201. The devices 220a-c can leverage existing PCIe packet architecture to transmit hints, or advanced information, to the root complex 210 to allow the root complex to perform certain optimization processes prior to receiving further data packets from the devices 220a-c. The devices 220a-c can access the host system 201 for memory reads, writes, streaming writes, cacheable operations, atomic operations, partial operations, Data Direct I/O, etc. Other use cases include caching policy determination (including cache prefetch), page initialization, and security policy setup, as well as other processes. The PCIe-compliant packet architecture is shown in more detail in FIG. 3.

Figure 3:
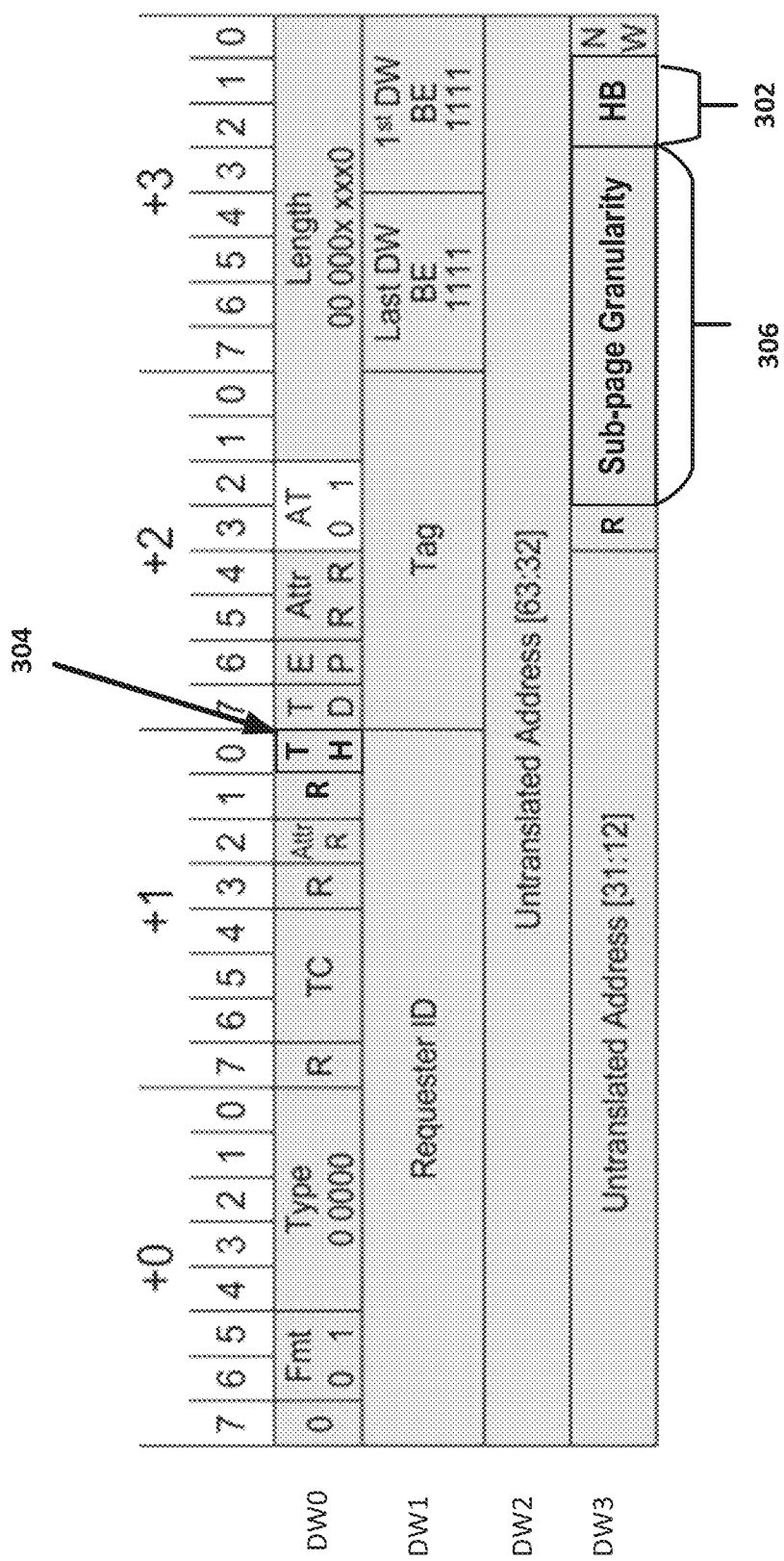
FIG. 3 is a schematic diagram of a data packet configured with hint bits in accordance with embodiments of the present disclosure.

FIG. 3 is an example PCIe-compliant data packet 300 in accordance with embodiments of the present disclosure. By using the data packet 300 to transmit a hint, the device exposes to the root complex the pages it intends to access in advance.

The example packet 300 shown in FIG. 3 is an Address Translation Services (ATS) packet. ATS packets allow a device to send a Virtual Address (VA)/Guest Physical Address (GPA) to Host Physical Address (HPA) translation request to the root complex on a page granularity in advance of the actual memory access request (e.g., DMA request). The ATS packet is particularly useful for providing hints about future memory accesses by the device because the ATS packet is transmitted prior to data read/writes. Other types of data packets can be transmitted to achieve similar results. For example, a zero length write can be used for the processing hint bits by using unused or reserved bits in the zero length write data packet.

The data packet 300 can include reserved bits at various double words of the packet. The reserved bits can be leveraged to include hints of the memory accesses that the device intends to perform. Table 1 provides an example of how reserved bits and unused bits can be used to provide hints to the root complex.

| Example Reserved Bits Allocation for Hints | | |
| --- | --- | --- |
| | ATS | Zero Length Write |
| Opcode | Memory Read | Memory Write |
| AT | 01 | 00 or 10 |
| Transaction Hint (TH) | DW0.byte1[0] (currently reserved) | 0 |
| BE | 0xFF | 0x00 |
| Length | 0x2 (multiple of 2) | 0x1 |
| 8 bit Vector | DW3.byte2[3:0], DW3.byte3[7:4] (currently reserved) | Addr[11:4] |
| Hint (2 bits) | DW3.byte3[2:1] (currently reserved) | Addr[2:1] |
| 1 bit for future expansion | DW3.byte3[3] (currently reserved) | Addr[3] |

Relating Table 1 to FIG. 3, the Transaction Hint (TH) bit 304 occupies DW 0, Byte 1, Bit 0 of the data packet 300. The TH bit 304 can be used to signify to the root complex that the data packet carries a hint about an upcoming memory access. Hint bits 302 can DW 3, Byte 3, Bits [2:1]. For ATS packets, the hint bits 302 occupy bits that were formerly reserved.

Similarly, for a Zero Length Write, as defined in Table 1, the lower address bits, which are unused, are being used to provide the same hints as a Translation Request.

Hint bits 302 are used to convey the intended usage from the device's perspective. The hints bits 302 are optional and are enabled when the device sets the Transaction Hint (TH) bit 304. Other reserved bits (e.g., reserved bits 306) can be used to provide sub-page granularity. (Noteworthy is that even when hints are enabled, hints may be ignored by the root complex.)

Figure 4:
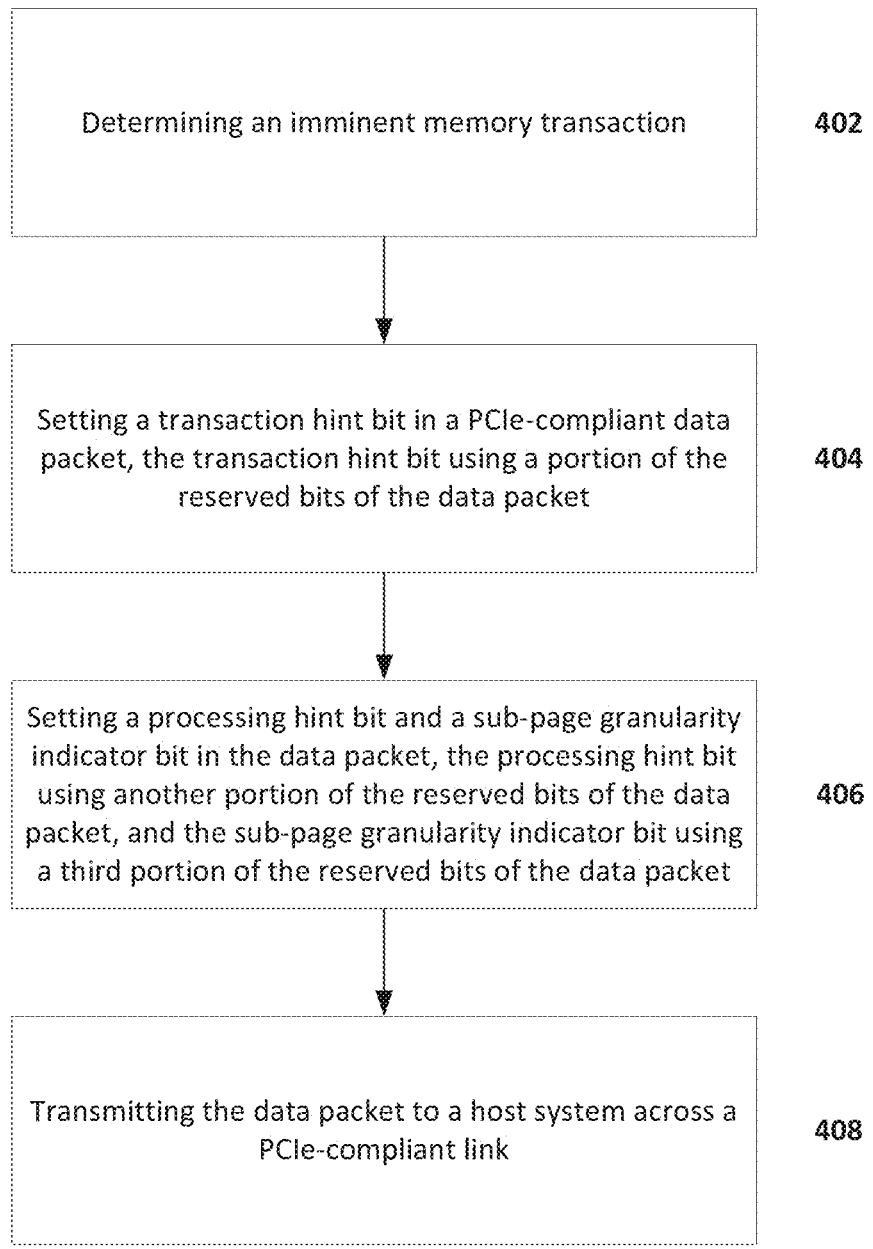
FIG. 4 is a process flow diagram for a device to configure a data packet with hint bits in accordance with embodiments of the present disclosure.

FIG. 4 is a process flow diagram 400 for a device to configure a data packet with hint bits in accordance with embodiments of the present disclosure. The device can determine an imminent memory transaction (402). The memory transaction can be a memory read or write, or other type of memory transaction. The determination of the imminent memory transaction can be to a certain page in memory that the device intends to access. The imminence of the memory transaction can include a memory transaction that will occur for the data stream the device is processing. The device can program a data packet that is to be sent to a root complex of a host system with a transaction hint (TH) bit (404). The TH bit can occupy a reserved bit of the data packet or a first portion of a reserved bit field of the data packet. For example, in an ATS packet, the TH bit can occupy DW0.byte 1.bit 0, where DW0.byte 1.bits [1:0] are reserved bits. The device can program the data packet with processing hint bits (and in some embodiments, can set sub-page granularity bits) indicating the nature of the imminent memory transaction (406). The processing hint bits can occupy one or more reserved bits of the data packet. For example, processing hint bits can include 2 bits and can occupy DW3.byte 3.bits [2:1]. The encodings for the hint bits can be as follows:

00 Streaming Writes
01 Reads
10 Atomics/Partials/DDIO
11 Cacheable operations (for Coherent devices)

Other reserved bits can also be used to provide sub-page granularity. For example, eight bits (DW3, Byte 3, Bits [7:3]

and DW3, Byte 2, Bits [2:0]) are used to provide sub-page granularity. Thus, for a 4 KB page, these 8 bits provide a one-hot vector which then gives a 512 B granularity for the hints. The processing hint bits can indicate a page granularity of the memory address space that will be accessed. Within a large page, the processing hints can pertain to a subset range of a page of the memory address space that will be accessed.

The device can then transmit the packet to the root complex (408).

Figure 5:
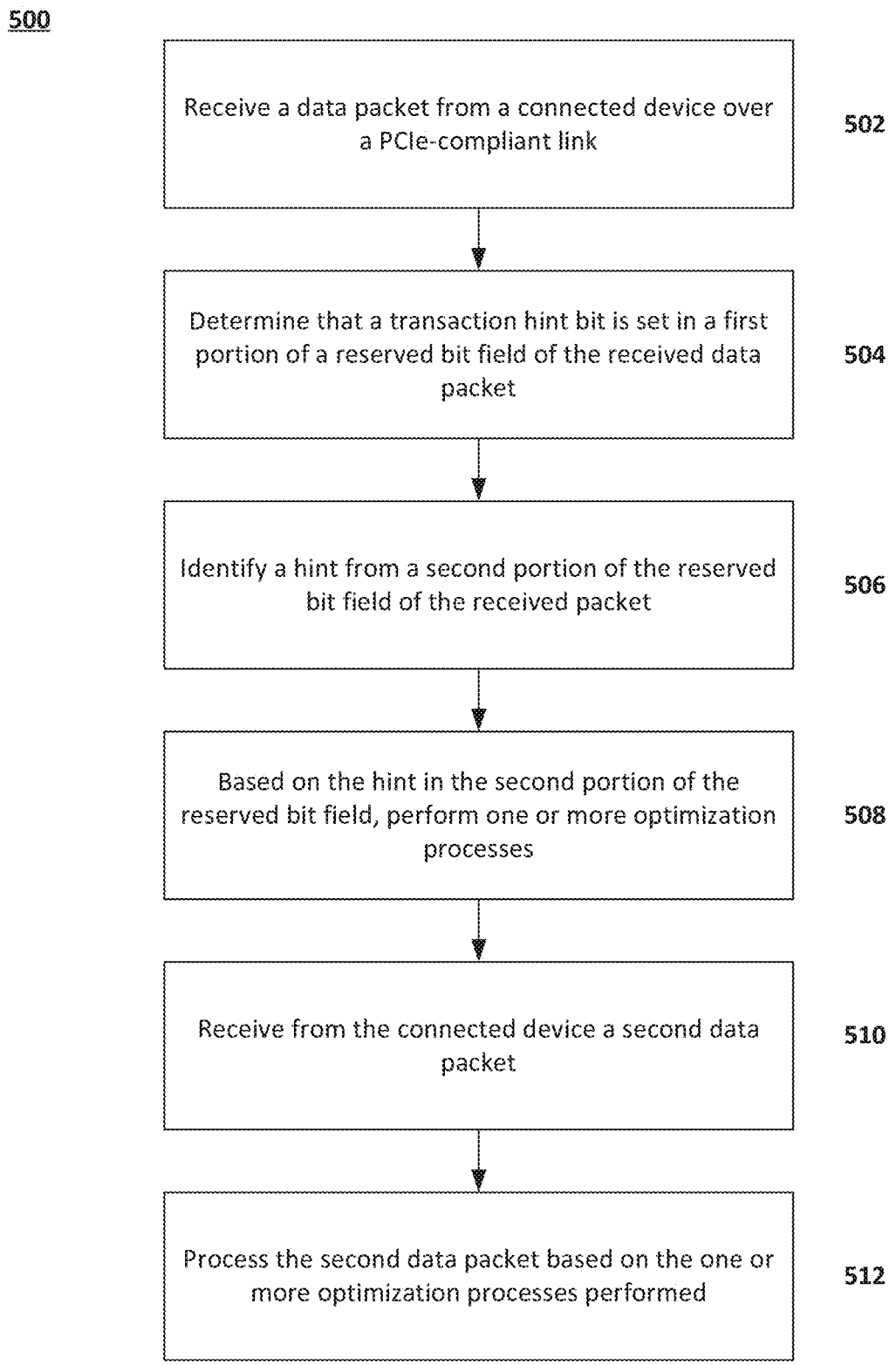
FIG. 5 is a process flow diagram for a root complex to process a received data packet in accordance with embodiments of the present disclosure.

FIG. 5 is a process flow diagram 500 for a root complex to process a received data packet in accordance with embodiments of the present disclosure. The root complex can receive a data packet from a device from across a PCIe-compliant link (502). The root complex can determine that a transaction hint bit is set in a first portion of a reserved bit field of the received data packet (504). For example, the root complex can identify a TH bit set in a reserved bit field. The presence of a set bit in a specified bit or bit field can trigger the root complex to examiner other predetermined reserved portions of the received data packet. For example, the presence of a set bit in a predefined bit location can cause the root complex to identify a hint bit set in another predefined bit location of the data packet (506). The root complex can identify, from the hint bits, an optimization process to perform to prepare for an imminent memory transaction for the device (508).

When the root complex identifies advance information about how a device intends to use a given address range or page in memory, it can make various optimizations in a CPU-specific manner. Some examples of these optimizations are given below but this is not a comprehensive list.

Caching Behavior

There can be various caching optimizations that the root complex may choose to enable depending on the type of device and kind of hint received in the data packet. For example, the root complex may choose to prefetch ownership in response to receiving a hint for "Streaming Writes." In embodiments, the root complex can prefetch and cache data in response to a hint for "Reads." In embodiments, the root complex can prefetch ownership and data for "Atomics/Partial" or "Cacheable operations."

Apart from prefetch, depending on type of device, the root complex may choose to make optimizations regarding cache allocation and replacement policies. For example, the root complex may choose to not enable DDIO for Streaming Writes (which causes cache thrash) or the root complex may choose a differentiated replacement policy in other cases (using a lower/higher LRU value).

Metadata Update & Page Initialization

Depending on the hint received in the received data packet, the root complex may choose to initialize a given page with specific characteristics. This initialization may include updating metadata stored with the page in memory. The metadata update may provide additional capabilities such as setting up security regions for the device.

The root complex can then receive a data packet for the memory transaction (510) and process the memory transaction using the optimization processes performed from the hint (512).

One interconnect fabric architecture includes the Peripheral Component Interconnect (PCI) Express (PCIe) architecture. A primary goal of PCIe is to enable components and devices from different vendors to inter-operate in an open architecture, spanning multiple market segments; Clients (Desktops and Mobile), Servers (Standard and Enterprise), and Embedded and Communication devices. PCIe is a high performance, general purpose I/O interconnect protocol defined for a wide variety of future computing and communication platforms. Some PCI attributes, such as its usage model, load-store architecture, and software interfaces, have been maintained through its revisions, whereas previous parallel bus implementations have been replaced by a highly scalable, fully serial interface. The more recent versions of PCI Express take advantage of advances in point-to-point interconnects, Switch-based technology, and packetized protocol to deliver new levels of performance and features. Power Management, Quality Of Service (QoS), Hot-Plug/Hot-Swap support, Data Integrity, and Error Handling are among some of the advanced features supported by PCI Express.

Figure 6:
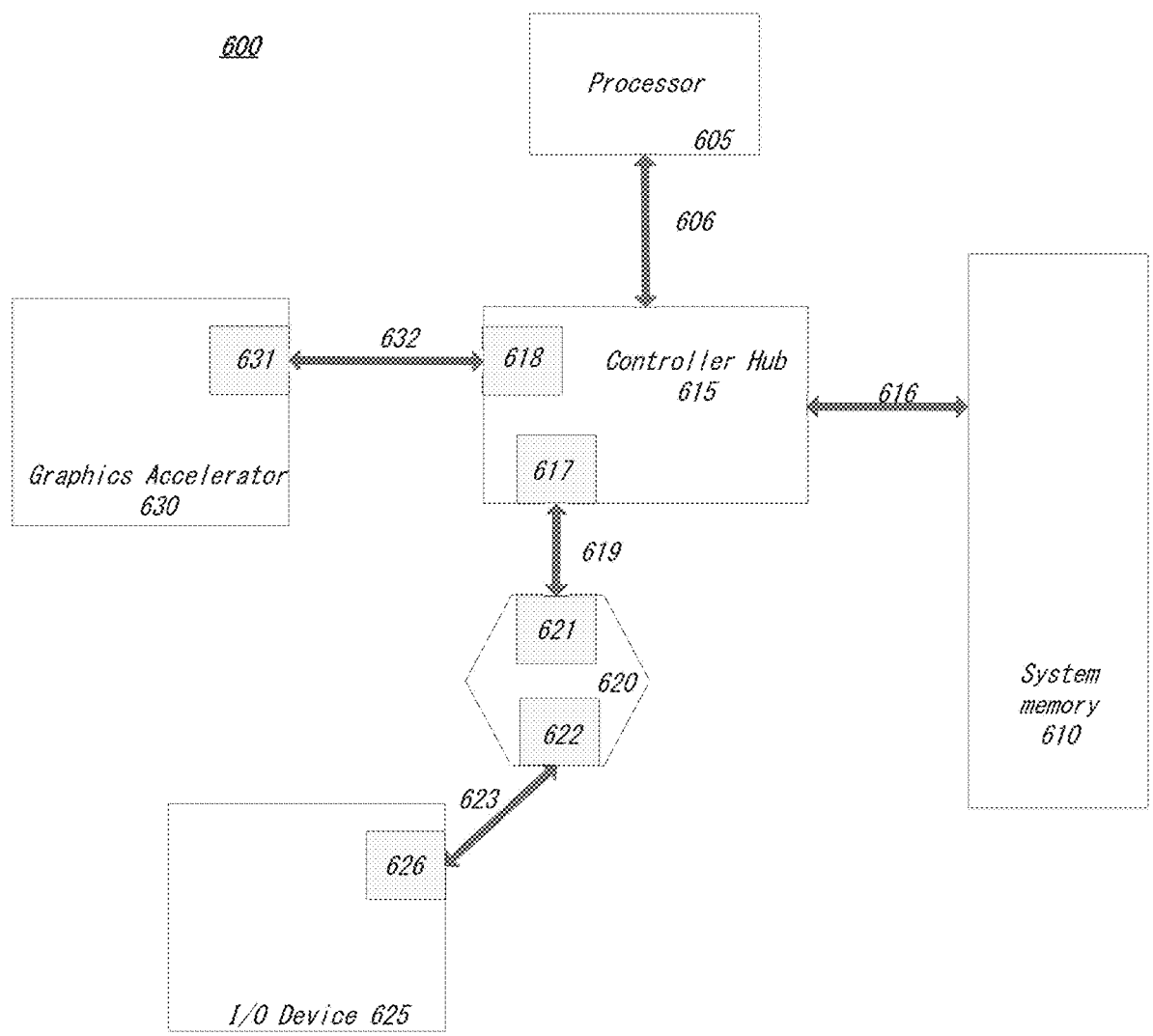
FIG. 6 illustrates an embodiment of a computing system including an interconnect architecture.

Referring to FIG. 6, an embodiment of a fabric composed of point-to-point links that interconnect a set of components is illustrated. System 600 includes processor 605 and system memory 610 coupled to controller hub 615. Processor 605 includes any processing element, such as a microprocessor, a host processor, an embedded processor, a co-processor, or other processor. Processor 605 is coupled to controller hub 615 through front-side bus (FSB) 606. In one embodiment, FSB 606 is a serial point-to-point interconnect as described below. In another embodiment, link 606 includes a serial, differential interconnect architecture that is compliant with different interconnect standard.

System memory 610 includes any memory device, such as random access memory (RAM), non-volatile (NV) memory, or other memory accessible by devices in system 600. System memory 610 is coupled to controller hub 615 through memory interface 616. Examples of a memory interface include a double-data rate (DDR) memory interface, a dual-channel DDR memory interface, and a dynamic RAM (DRAM) memory interface.

In one embodiment, controller hub 615 is a root hub, root complex, or root controller in a Peripheral Component Interconnect Express (PCIe) interconnection hierarchy. Examples of controller hub 615 include a chipset, a memory controller hub (MCH), a northbridge, an interconnect controller hub (ICH) a southbridge, and a root controller/hub. Often the term chipset refers to two physically separate controller hubs, i.e. a memory controller hub (MCH) coupled to an interconnect controller hub (ICH). Note that current systems often include the MCH integrated with processor 605, while controller 615 is to communicate with I/O devices, in a similar manner as described below. In some embodiments, peer-to-peer routing is optionally supported through root complex 615.

The root complex 615 can receive a data packet from a connected device, such as an I/O device 625. The data packet can include a hint bit set, which prompts the root complex to evaluate one or more reserved bits to determine whether a hint bit is present in the data packet. The hint bit can provide a hint or advanced information to the root complex about how the I/O device 625 intends on using an identified address range or page in memory. The root complex 615 can perform various optimizations on behalf of a processor core, as described above.

Here, controller hub 615 is coupled to switch/bridge 620 through serial link 619. Input/output modules 617 and 621, which may also be referred to as interfaces/ports 617 and 621, include/implement a layered protocol stack to provide communication between controller hub 615 and switch 620. In one embodiment, multiple devices are capable of being coupled to switch 620.

Switch/bridge 620 routes packets/messages from device 625 upstream, i.e. up a hierarchy towards a root complex (e.g., controller hub 615) and downstream, i.e. down a hierarchy away from a root controller, from processor 605 or system memory 610 to device 625. Switch 620, in one embodiment, is referred to as a logical assembly of multiple virtual PCI-to-PCI bridge devices. Device 625 includes any internal or external device or component to be coupled to an electronic system, such as an I/O device, a Network Interface Controller (NIC), an add-in card, an audio processor, a network processor, a hard-drive, a storage device, a CD/DVD ROM, a monitor, a printer, a mouse, a keyboard, a router, a portable storage device, a Firewire device, a Universal Serial Bus (USB) device, a scanner, and other input/output devices. Often in the PCIe vernacular, such as device, is referred to as an endpoint. Although not specifically shown, device 625 may include a PCIe to PCI/PCI-X bridge to support legacy or other version PCI devices. Endpoint devices in PCIe are often classified as legacy, PCIe, or root complex integrated endpoints. The device 625 can be coupled to the switch 620 by a serial link 623.

Graphics accelerator 630 is also coupled to controller hub 615 through serial link 632. In one embodiment, graphics accelerator 630 is coupled to an MCH, which is coupled to an ICH. Switch 620, and accordingly I/O device 625, is then coupled to the ICH. I/O modules 631 and 618 are also to implement a layered protocol stack to communicate between graphics accelerator 630 and controller hub 615. Similar to the MCH discussion above, a graphics controller or the graphics accelerator 630 itself may be integrated in processor 605.

Figure 7:
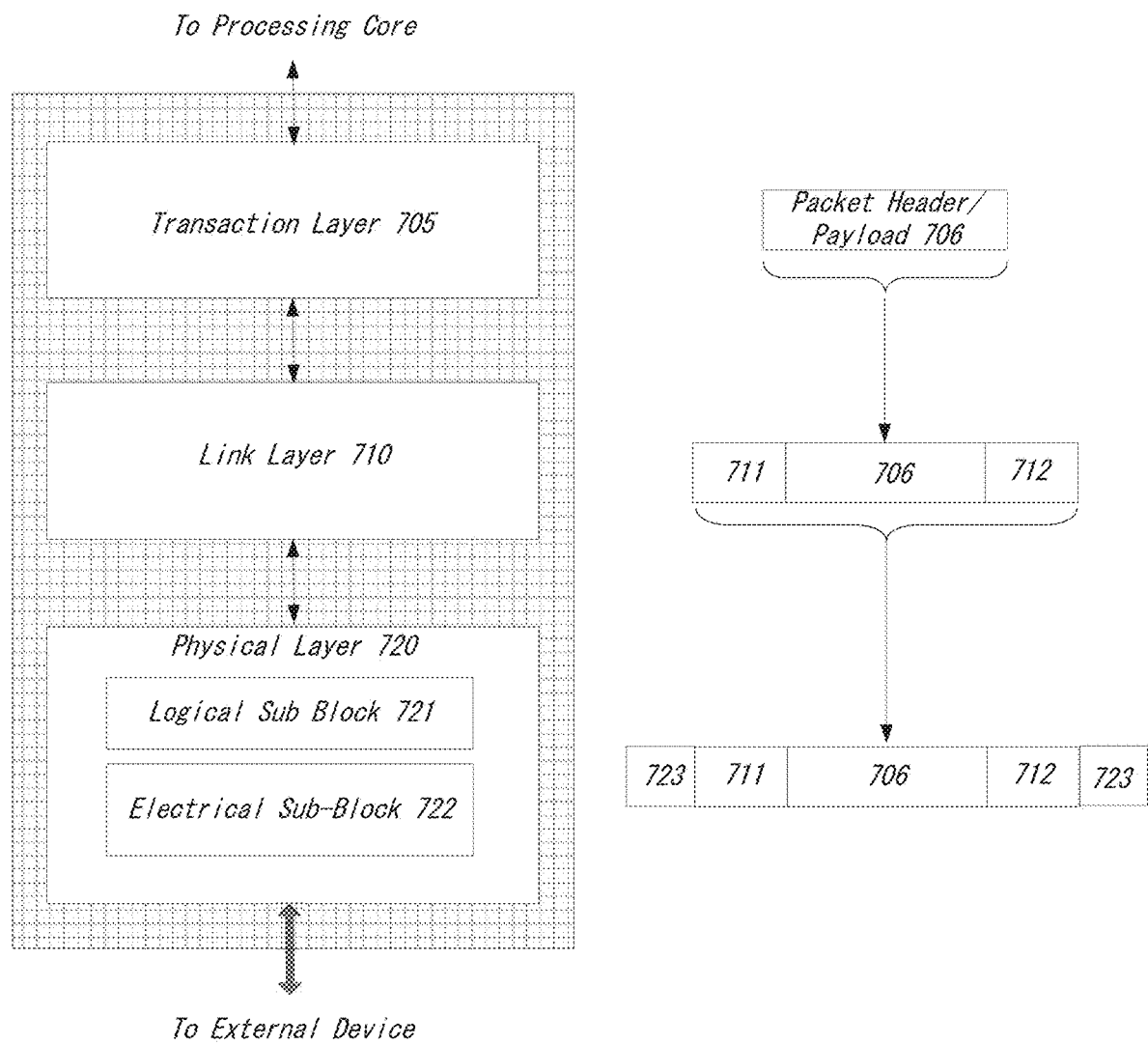
FIG. 7 illustrates an embodiment of a interconnect architecture including a layered stack.

Turning to FIG. 7 an embodiment of a layered protocol stack is illustrated. Layered protocol stack 700 includes any form of a layered communication stack, such as a Quick Path Interconnect (QPI) stack, a PCIe stack, a next generation high performance computing interconnect stack, or other layered stack. Although the discussion immediately below in reference to FIGS. 6-12 are in relation to a PCIe stack, the same concepts may be applied to other interconnect stacks. In one embodiment, protocol stack 700 is a PCIe protocol stack including transaction layer 705, link layer 710, and physical layer 720. An interface, such as interfaces 617, 618, 621, 622, 626, and 631 in FIG. 6, may be represented as communication protocol stack 700. Representation as a communication protocol stack may also be referred to as a module or interface implementing/including a protocol stack.

PCI Express uses packets to communicate information between components. Packets are formed in the Transaction Layer 705 and Data Link Layer 710 to carry the information from the transmitting component to the receiving component. As the transmitted packets flow through the other layers, they are extended with additional information necessary to handle packets at those layers. At the receiving side the reverse process occurs and packets get transformed from their Physical Layer 720 representation to the Data Link Layer 710 representation and finally (for Transaction Layer Packets) to the form that can be processed by the Transaction Layer 705 of the receiving device.

Transaction Layer

In one embodiment, transaction layer 705 is to provide an interface between a device's processing core and the interconnect architecture, such as data link layer 710 and physical layer 720. In this regard, a primary responsibility of the transaction layer 705 is the assembly and disassembly of packets (i.e., transaction layer packets, or TLPs). The translation layer 705 typically manages credit-base flow control for TLPs. PCIe implements split transactions, i.e. transactions with request and response separated by time, allowing a link to carry other traffic while the target device gathers data for the response.

In addition PCIe utilizes credit-based flow control. In this scheme, a device advertises an initial amount of credit for each of the receive buffers in Transaction Layer 705. An external device at the opposite end of the link, such as controller hub 115 in FIG. 1, counts the number of credits consumed by each TLP. A transaction may be transmitted if the transaction does not exceed a credit limit. Upon receiving a response an amount of credit is restored. An advantage of a credit scheme is that the latency of credit return does not affect performance, provided that the credit limit is not encountered.

In one embodiment, four transaction address spaces include a configuration address space, a memory address space, an input/output address space, and a message address space. Memory space transactions include one or more of read requests and write requests to transfer data to/from a memory-mapped location. In one embodiment, memory space transactions are capable of using two different address formats, e.g., a short address format, such as a 32-bit address, or a long address format, such as 64-bit address. Configuration space transactions are used to access configuration space of the PCIe devices. Transactions to the configuration space include read requests and write requests. Message space transactions (or, simply messages) are defined to support in-band communication between PCIe agents.

Therefore, in one embodiment, transaction layer 705 assembles packet header/payload 706. Format for current packet headers/payloads may be found in the PCIe specification at the PCIe specification website.

Figure 8:
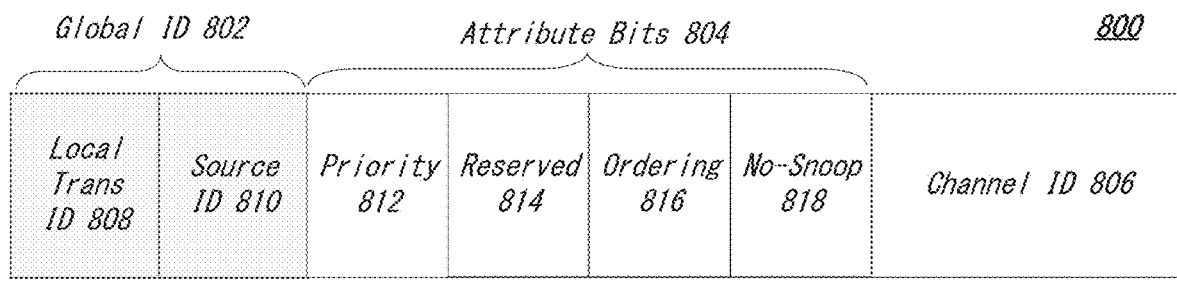
FIG. 8 illustrates an embodiment of a request or packet to be generated or received within an interconnect architecture.

Quickly referring to FIG. 8, an embodiment of a PCIe transaction descriptor is illustrated. In one embodiment, transaction descriptor 800 is a mechanism for carrying transaction information. In this regard, transaction descriptor 800 supports identification of transactions in a system. Other potential uses include tracking modifications of default transaction ordering and association of transaction with channels.

Transaction descriptor 800 includes global identifier field 802, attributes field 1004 and channel identifier field 806. In the illustrated example, global identifier field 802 is depicted comprising local transaction identifier field 808 and source identifier field 810. In one embodiment, global transaction identifier 802 is unique for all outstanding requests.

According to one implementation, local transaction identifier field 808 is a field generated by a requesting agent, and it is unique for all outstanding requests that require a completion for that requesting agent. Furthermore, in this example, source identifier 810 uniquely identifies the requestor agent within a PCIe hierarchy. Accordingly, together with source ID 810, local transaction identifier 808 field provides global identification of a transaction within a hierarchy domain.

Attributes field 804 specifies characteristics and relationships of the transaction. In this regard, attributes field 804 is potentially used to provide additional information that allows modification of the default handling of transactions. In one embodiment, attributes field 804 includes priority field 812, reserved field 814, ordering field 816, and no-snoop field 818. Here, priority sub-field 812 may be modified by an initiator to assign a priority to the transaction. Reserved attribute field 814 is left reserved for future, or vendor-defined usage. Possible usage models using priority or security attributes may be implemented using the reserved attribute field.

In this example, ordering attribute field 816 is used to supply optional information conveying the type of ordering that may modify default ordering rules. According to one example implementation, an ordering attribute of "0" denotes default ordering rules are to apply, wherein an ordering attribute of "1" denotes relaxed ordering, wherein writes can pass writes in the same direction, and read completions can pass writes in the same direction. Snoop attribute field 818 is utilized to determine if transactions are snooped. As shown, channel ID Field 806 identifies a channel that a transaction is associated with.

Link Layer

Returning to FIG. 7, Link layer 710, also referred to as data link layer 710, acts as an intermediate stage between transaction layer 705 and the physical layer 720. In one embodiment, a responsibility of the data link layer 710 is providing a reliable mechanism for exchanging Transaction Layer Packets (TLPs) between two components a link. One side of the Data Link Layer 710 accepts TLPs assembled by the Transaction Layer 705, applies packet sequence identifier 710, i.e. an identification number or packet number, calculates and applies an error detection code, i.e. CRC 712, and submits the modified TLPs to the Physical Layer 720 for transmission across a physical to an external device.

Physical Layer

In one embodiment, physical layer 720 includes logical sub block 721 and electrical sub-block 722 to physically transmit a packet to an external device. Here, logical sub-block 721 is responsible for the "digital" functions of Physical Layer 721. In this regard, the logical sub-block includes a transmit section to prepare outgoing information for transmission by physical sub-block 722, and a receiver section to identify and prepare received information before passing it to the Link Layer 1110.

Physical block 722 includes a transmitter and a receiver. The transmitter is supplied by logical sub-block 721 with symbols, which the transmitter serializes and transmits onto to an external device. The receiver is supplied with serialized symbols from an external device and transforms the received signals into a bit-stream. The bit-stream is de-serialized and supplied to logical sub-block 721. In one embodiment, an 8 b/10 b transmission code is employed, where ten-bit symbols are transmitted/received. Here, special symbols are used to frame a packet with frames 723. In addition, in one example, the receiver also provides a symbol clock recovered from the incoming serial stream.

As stated above, although transaction layer 705, link layer 710, and physical layer 1020 are discussed in reference to a specific embodiment of a PCIe protocol stack, a layered protocol stack is not so limited. In fact, any layered protocol may be included/implemented. As an example, an port/interface that is represented as a layered protocol includes: (1) a first layer to assemble packets, i.e. a transaction layer; a second layer to sequence packets, i.e. a link layer; and a third layer to transmit the packets, i.e. a physical layer. As a specific example, a common standard interface (CSI) layered protocol is utilized.

Figure 9:
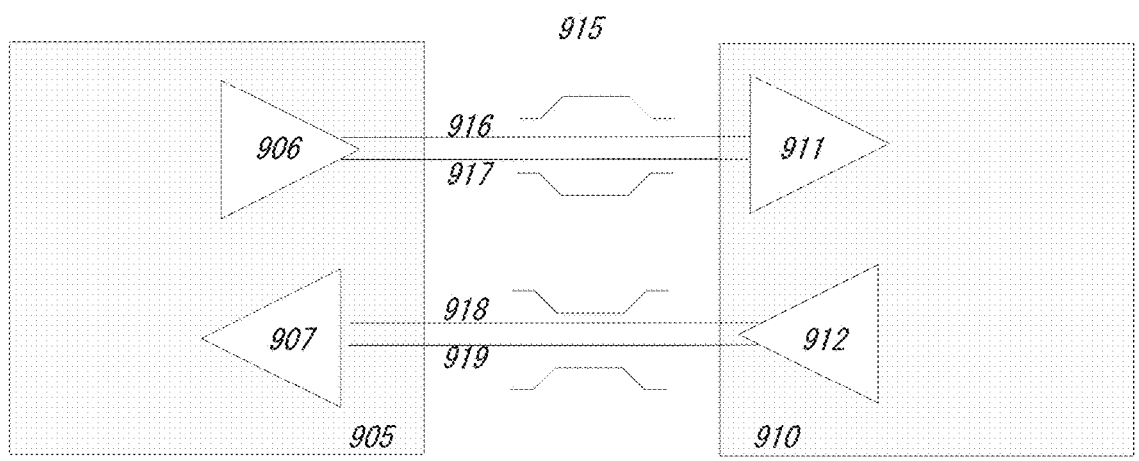
FIG. 9 illustrates an embodiment of a transmitter and receiver pair for an interconnect architecture.

Referring next to FIG. 9, an embodiment of a PCIe serial point to point fabric is illustrated. Although an embodiment of a PCIe serial point-to-point link is illustrated, a serial point-to-point link is not so limited, as it includes any transmission path for transmitting serial data. In the embodiment shown, a basic PCIe link includes two, low-voltage, differentially driven signal pairs: a transmit pair 906/911 and a receive pair 912/907. Accordingly, device 905 includes transmission logic 906 to transmit data to device 910 and receiving logic 907 to receive data from device 910. In other words, two transmitting paths, i.e. paths 916 and 917, and two receiving paths, i.e. paths 918 and 919, are included in a PCIe link.

A transmission path refers to any path for transmitting data, such as a transmission line, a copper line, an optical line, a wireless communication channel, an infrared communication link, or other communication path. A connection between two devices, such as device 905 and device 910, is referred to as a link, such as link 915. A link may support one lane—each lane representing a set of differential signal pairs (one pair for transmission, one pair for reception). To scale bandwidth, a link may aggregate multiple lanes denoted by xN, where N is any supported Link width, such as 1, 2, 4, 8, 12, 16, 32, 64, or wider.

A differential pair refers to two transmission paths, such as lines 916 and 917, to transmit differential signals. As an example, when line 916 toggles from a low voltage level to a high voltage level, i.e. a rising edge, line 917 drives from a high logic level to a low logic level, i.e. a falling edge. Differential signals potentially demonstrate better electrical characteristics, such as better signal integrity, i.e. cross-coupling, voltage overshoot/undershoot, ringing, etc. This allows for better timing window, which enables faster transmission frequencies.

Note that the apparatus', methods', and systems described above may be implemented in any electronic device or system as aforementioned. As specific illustrations, the figures below provide exemplary systems for utilizing the invention as described herein. As the systems below are described in more detail, a number of different interconnects are disclosed, described, and revisited from the discussion above. And as is readily apparent, the advances described above may be applied to any of those interconnects, fabrics, or architectures.

Figure 10:
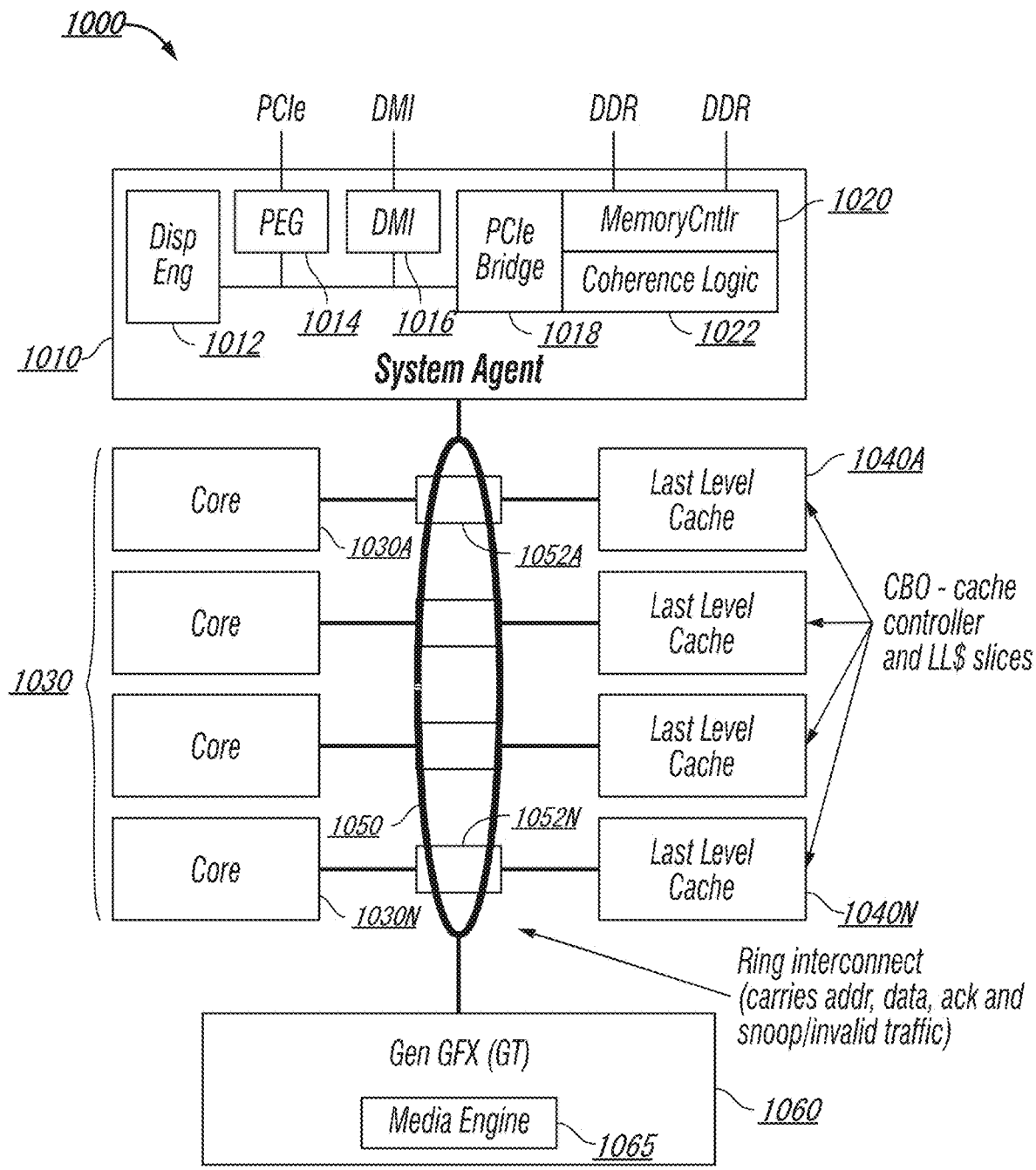
FIG. 10 illustrates an embodiment of a multicore processor.

Referring now to FIG. 10, shown is a block diagram of an embodiment of a multicore processor. As shown in the embodiment of FIG. 10, processor 1000 includes multiple domains. Specifically, a core domain 1030 includes a plurality of cores 1030A-1030N, a graphics domain 1060 includes one or more graphics engines having a media engine 1065, and a system agent domain 1010.

In various embodiments, system agent domain 1010 handles power control events and power management, such that individual units of domains 1030 and 1060 (e.g. cores and/or graphics engines) are independently controllable to dynamically operate at an appropriate power mode/level (e.g. active, turbo, sleep, hibernate, deep sleep, or other Advanced Configuration Power Interface like state) in light of the activity (or inactivity) occurring in the given unit. Each of domains 1030 and 1060 may operate at different voltage and/or power, and furthermore the individual units within the domains each potentially operate at an independent frequency and voltage. Note that while only shown with three domains, understand the scope of the present invention is not limited in this regard and additional domains may be present in other embodiments.

As shown, each core 1030 further includes low level caches in addition to various execution units and additional processing elements. Here, the various cores are coupled to each other and to a shared cache memory that is formed of a plurality of units or slices of a last level cache (LLC) 1040A-1040N; these LLCs often include storage and cache controller functionality and are shared amongst the cores, as well as potentially among the graphics engine too.

As seen, a ring interconnect 1050 couples the cores together, and provides interconnection between the core domain 1030, graphics domain 1060 and system agent circuitry 1010, via a plurality of ring stops 1052A-1052N, each at a coupling between a core and LLC slice. As seen in FIG. 10, interconnect 1050 is used to carry various information, including address information, data information, acknowledgement information, and snoop/invalid information. Although a ring interconnect is illustrated, any known on-die interconnect or fabric may be utilized. As an illustrative example, some of the fabrics discussed above (e.g. another on-die interconnect, Intel On-chip System Fabric (IOSF), an Advanced Microcontroller Bus Architecture (AMBA) interconnect, a multi-dimensional mesh fabric, or other known interconnect architecture) may be utilized in a similar fashion.

As further depicted, system agent domain 1010 includes display engine 1012 which is to provide control of and an interface to an associated display. System agent domain 1010 may include other units, such as: an integrated memory controller 1020 that provides for an interface to a system memory (e.g., a DRAM implemented with multiple DIMMs; coherence logic 1022 to perform memory coherence operations. Multiple interfaces may be present to enable interconnection between the processor and other circuitry. For example, in one embodiment at least one direct media interface (DMI) 1016 interface is provided as well as one or more PCIe™ interfaces 1014. The display engine and these interfaces typically couple to memory via a PCIe™ bridge 1018. Still further, to provide for communications between other agents, such as additional processors or other circuitry, one or more other interfaces (e.g. an Intel® Quick Path Interconnect (QPI) fabric) may be provided.

Figure 11:
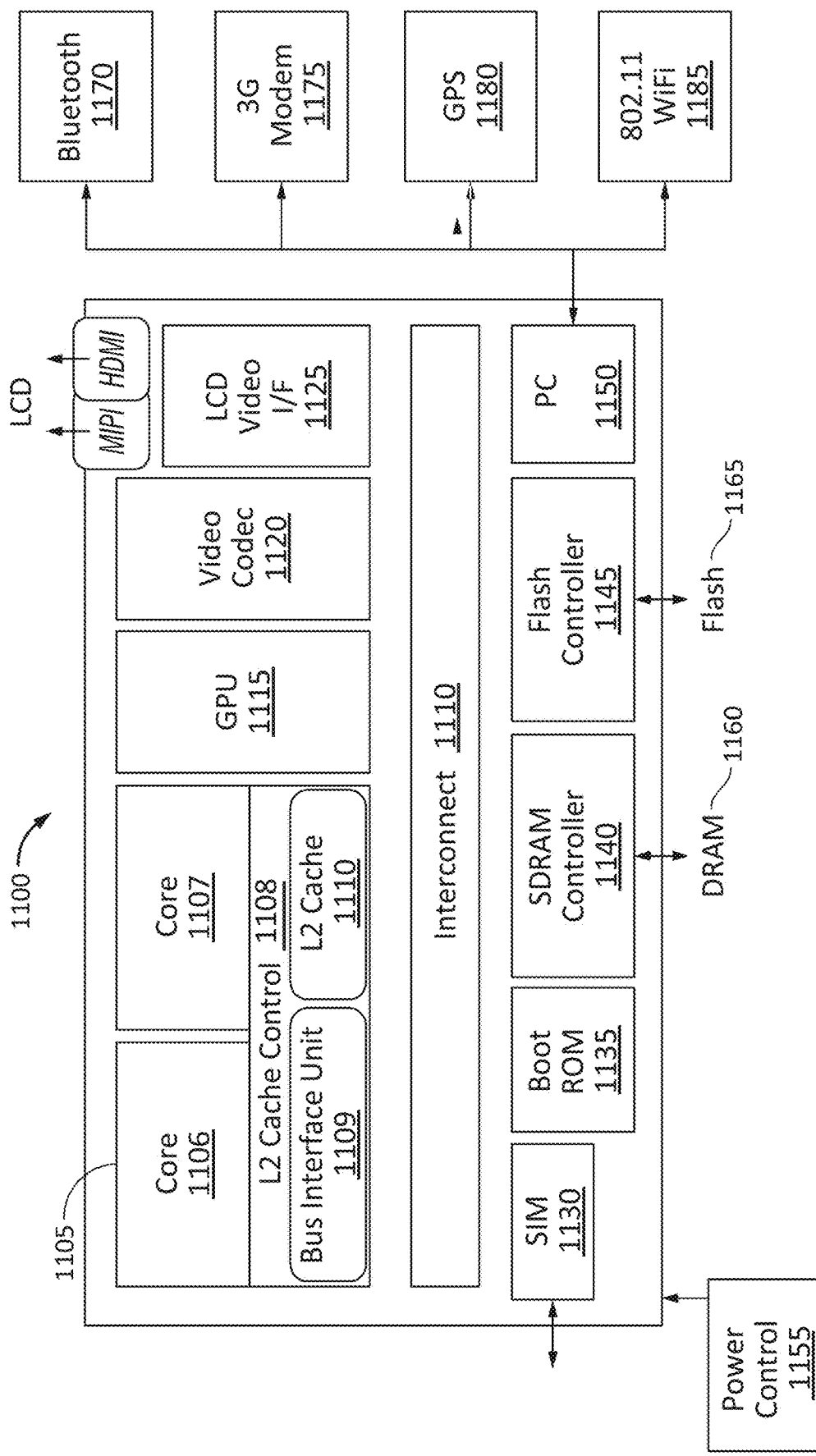
FIG. 11 illustrates another embodiment of a block diagram for a computing system.

Turning next to FIG. 11, an embodiment of a system on-chip (SOC) design in accordance with the inventions is depicted. As a specific illustrative example, SOC 1100 is included in user equipment (UE). In one embodiment, UE refers to any device to be used by an end-user to communicate, such as a hand-held phone, smartphone, tablet, ultra-thin notebook, notebook with broadband adapter, or any other similar communication device. Often a UE connects to a base station or node, which potentially corresponds in nature to a mobile station (MS) in a GSM network.

Here, SOC 1100 includes 2 cores—1106 and 1107. Similar to the discussion above, cores 1106 and 1107 may conform to an Instruction Set Architecture, such as an Intel® Architecture Core™-based processor, an Advanced Micro Devices, Inc. (AMD) processor, a MIPS-based processor, an ARM-based processor design, or a customer thereof, as well as their licensees or adopters. Cores 1106 and 1107 are coupled to cache control 1108 that is associated with bus interface unit 1109 and L2 cache 1110 to communicate with other parts of system 1100. Interconnect 1110 includes an on-chip interconnect, such as an IOSF, AMBA, or other interconnect discussed above, which potentially implements one or more aspects of the described invention.

Interface 1110 provides communication channels to the other components, such as a Subscriber Identity Module (SIM) 1130 to interface with a SIM card, a boot ROM 1135 to hold boot code for execution by cores 1106 and 1107 to initialize and boot SOC 1100, a SDRAM controller 1140 to interface with external memory (e.g. DRAM 1160), a flash controller 1145 to interface with non-volatile memory (e.g. Flash 1165), a peripheral control 1150 (e.g. Serial Peripheral Interface) to interface with peripherals, video codecs 1120 and Video interface 1125 to display and receive input (e.g. touch enabled input), GPU 1115 to perform graphics related computations, etc. Any of these interfaces may incorporate aspects of the invention described herein.

In addition, the system illustrates peripherals for communication, such as a Bluetooth module 1170, 3G modem 1175, GPS 1185, and WiFi 1185. Note as stated above, a UE includes a radio for communication. As a result, these peripheral communication modules are not all required. However, in a UE some form a radio for external communication is to be included.

Figure 12:
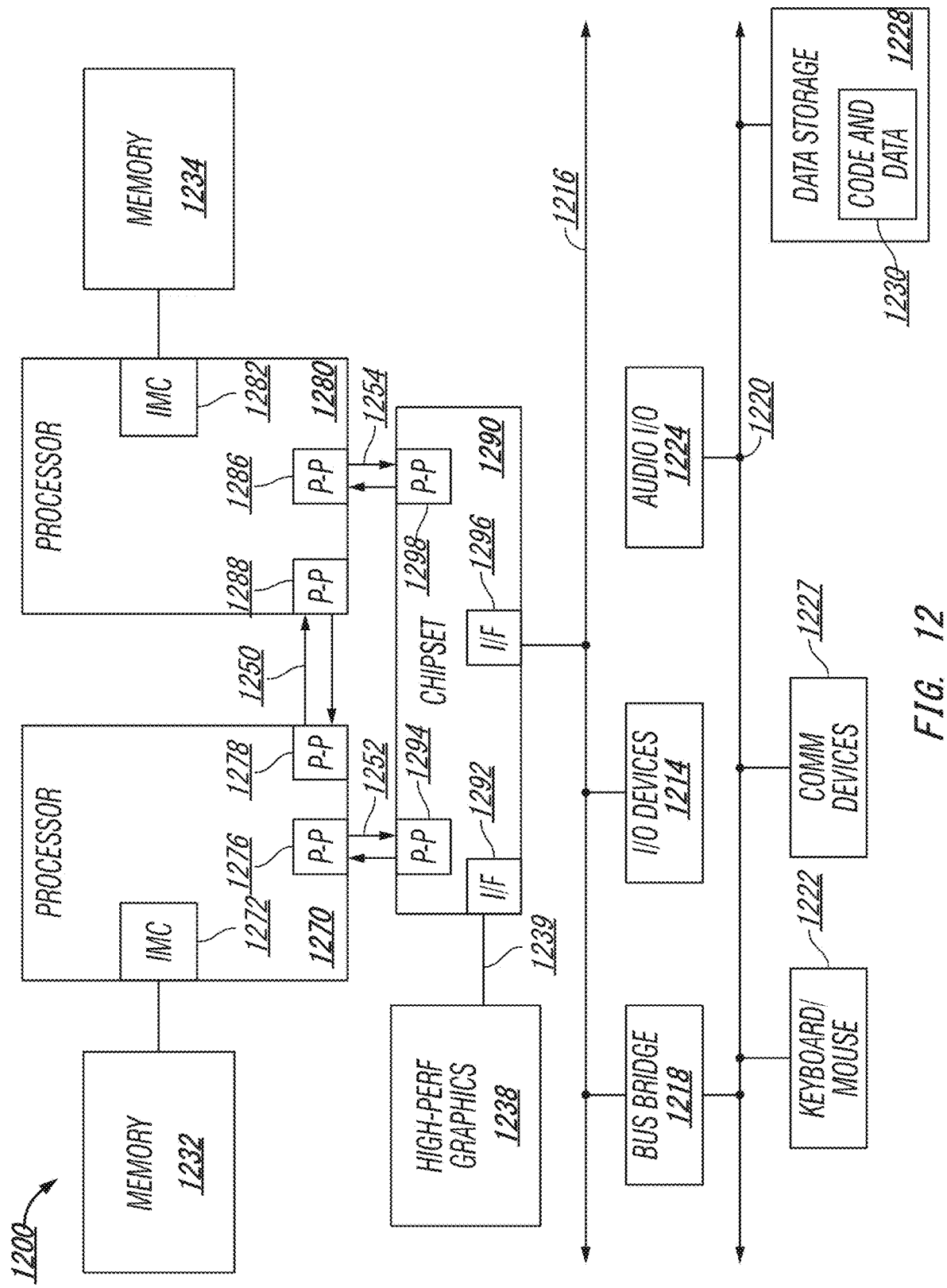
FIG. 12 illustrates an embodiment of a block for a computing system including multiple processor sockets.

Referring now to FIG. 12, shown is a block diagram of a second system 1200 in accordance with an embodiment of the present invention. As shown in FIG. 12, multiprocessor system 1200 is a point-to-point interconnect system, and includes a first processor 1270 and a second processor 1280 coupled via a point-to-point interconnect 1250. Each of processors 1270 and 1280 may be some version of a processor. In one embodiment, 1252 and 1254 are part of a serial, point-to-point coherent interconnect fabric, such as Intel's Quick Path Interconnect (QPI) architecture. As a result, the invention may be implemented within the QPI architecture.

While shown with only two processors 1270, 1280, it is to be understood that the scope of the present invention is not so limited. In other embodiments, one or more additional processors may be present in a given processor.

Processors 1270 and 1280 are shown including integrated memory controller units 1272 and 1282, respectively. Processor 1270 also includes as part of its bus controller units point-to-point (P-P) interfaces 1276 and 1278; similarly, second processor 1280 includes P-P interfaces 1286 and 1288. Processors 1270, 1280 may exchange information via a point-to-point (P-P) interface 1250 using P-P interface circuits 1278, 1288. As shown in FIG. 12, IMCs 1272 and 1282 couple the processors to respective memories, namely a memory 1232 and a memory 1234, which may be portions of main memory locally attached to the respective processors.

Processors 1270, 1280 each exchange information with a chipset 1290 via individual P-P interfaces 1252, 1254 using point to point interface circuits 1276, 1294, 1286, 1298. Chipset 1290 also exchanges information with a high-performance graphics circuit 1238 via an interface circuit 1292 along a high-performance graphics interconnect 1239.

A shared cache (not shown) may be included in either processor or outside of both processors; yet connected with the processors via P-P interconnect, such that either or both processors' local cache information may be stored in the shared cache if a processor is placed into a low power mode.

Chipset 1290 may be coupled to a first bus 1216 via an interface 1296. In one embodiment, first bus 1216 may be a Peripheral Component Interconnect (PCI) bus, or a bus such as a PCI Express bus or another third generation I/O interconnect bus, although the scope of the present invention is not so limited.

As shown in FIG. 12, various I/O devices 1214 are coupled to first bus 1216, along with a bus bridge 1218 which couples first bus 1216 to a second bus 1220. In one embodiment, second bus 1220 includes a low pin count (LPC) bus. Various devices are coupled to second bus 1220 including, for example, a keyboard and/or mouse 1222, communication devices 1227 and a storage unit 1228 such as a disk drive or other mass storage device which often includes instructions/code and data 1230, in one embodiment. Further, an audio I/O 1224 is shown coupled to second bus 1220. Note that other architectures are possible, where the included components and interconnect architectures vary. For example, instead of the point-to-point architecture of FIG. 12, a system may implement a multi-drop bus or other such architecture.

While the present invention has been described with respect to a limited number of embodiments, those skilled in the art will appreciate numerous modifications and variations therefrom. It is intended that the appended claims cover all such modifications and variations as fall within the true spirit and scope of this present invention.

A design may go through various stages, from creation to simulation to fabrication. Data representing a design may represent the design in a number of manners. First, as is useful in simulations, the hardware may be represented using a hardware description language or another functional description language. Additionally, a circuit level model with logic and/or transistor gates may be produced at some stages of the design process. Furthermore, most designs, at some stage, reach a level of data representing the physical placement of various devices in the hardware model. In the case where conventional semiconductor fabrication techniques are used, the data representing the hardware model may be the data specifying the presence or absence of various features on different mask layers for masks used to produce the integrated circuit. In any representation of the design, the data may be stored in any form of a machine readable medium. A memory or a magnetic or optical storage such as a disc may be the machine readable medium to store information transmitted via optical or electrical wave modulated or otherwise generated to transmit such information. When an electrical carrier wave indicating or carrying the code or design is transmitted, to the extent that copying, buffering, or re-transmission of the electrical signal is performed, a new copy is made. Thus, a communication provider or a network provider may store on a tangible, machine-readable medium, at least temporarily, an article, such as information encoded into a carrier wave, embodying techniques of embodiments of the present invention.

A module as used herein refers to any combination of hardware, software, and/or firmware. As an example, a module includes hardware, such as a micro-controller, associated with a non-transitory medium to store code adapted to be executed by the micro-controller. Therefore, reference to a module, in one embodiment, refers to the hardware, which is specifically configured to recognize and/or execute the code to be held on a non-transitory medium. Furthermore, in another embodiment, use of a module refers to the non-transitory medium including the code, which is specifically adapted to be executed by the microcontroller to perform predetermined operations. And as can be inferred, in yet another embodiment, the term module (in this example) may refer to the combination of the microcontroller and the non-transitory medium. Often module boundaries that are illustrated as separate commonly vary and potentially overlap. For example, a first and a second module may share hardware, software, firmware, or a combination thereof, while potentially retaining some independent hardware, software, or firmware. In one embodiment, use of the term logic includes hardware, such as transistors, registers, or other hardware, such as programmable logic devices.

Use of the phrase 'to' or 'configured to,' in one embodiment, refers to arranging, putting together, manufacturing, offering to sell, importing and/or designing an apparatus, hardware, logic, or element to perform a designated or determined task. In this example, an apparatus or element thereof that is not operating is still 'configured to' perform a designated task if it is designed, coupled, and/or interconnected to perform said designated task. As a purely illustrative example, a logic gate may provide a 0 or a 1 during operation. But a logic gate 'configured to' provide an enable signal to a clock does not include every potential logic gate that may provide a 1 or 0. Instead, the logic gate is one coupled in some manner that during operation the 1 or 0 output is to enable the clock. Note once again that use of the term 'configured to' does not require operation, but instead focus on the latent state of an apparatus, hardware, and/or element, where in the latent state the apparatus, hardware, and/or element is designed to perform a particular task when the apparatus, hardware, and/or element is operating.

Furthermore, use of the phrases 'capable of/to,' and or 'operable to,' in one embodiment, refers to some apparatus, logic, hardware, and/or element designed in such a way to enable use of the apparatus, logic, hardware, and/or element in a specified manner. Note as above that use of to, capable to, or operable to, in one embodiment, refers to the latent state of an apparatus, logic, hardware, and/or element, where the apparatus, logic, hardware, and/or element is not operating but is designed in such a manner to enable use of an apparatus in a specified manner.

A value, as used herein, includes any known representation of a number, a state, a logical state, or a binary logical state. Often, the use of logic levels, logic values, or logical values is also referred to as 1's and 0's, which simply represents binary logic states. For example, a 1 refers to a high logic level and 0 refers to a low logic level. In one embodiment, a storage cell, such as a transistor or flash cell, may be capable of holding a single logical value or multiple logical values. However, other representations of values in computer systems have been used. For example the decimal number ten may also be represented as a binary value of 1010 and a hexadecimal letter A. Therefore, a value includes any representation of information capable of being held in a computer system.

Moreover, states may be represented by values or portions of values. As an example, a first value, such as a logical one, may represent a default or initial state, while a second value, such as a logical zero, may represent a non-default state. In addition, the terms reset and set, in one embodiment, refer to a default and an updated value or state, respectively. For example, a default value potentially includes a high logical value, i.e. reset, while an updated value potentially includes a low logical value, i.e. set. Note that any combination of values may be utilized to represent any number of states.

The embodiments of methods, hardware, software, firmware or code set forth above may be implemented via instructions or code stored on a machine-accessible, machine readable, computer accessible, or computer readable medium which are executable by a processing element. A non-transitory machine-accessible/readable medium includes any mechanism that provides (i.e., stores and/or transmits) information in a form readable by a machine, such as a computer or electronic system. For example, a non-transitory machine-accessible medium includes random-access memory (RAM), such as static RAM (SRAM) or dynamic RAM (DRAM); ROM; magnetic or optical storage medium; flash memory devices; electrical storage devices; optical storage devices; acoustical storage devices; other form of storage devices for holding information received from transitory (propagated) signals (e.g., carrier waves, infrared signals, digital signals); etc., which are to be distinguished from the non-transitory mediums that may receive information there from.

Instructions used to program logic to perform embodiments of the invention may be stored within a memory in the system, such as DRAM, cache, flash memory, or other storage. Furthermore, the instructions can be distributed via a network or by way of other computer readable media. Thus a machine-readable medium may include any mechanism for storing or transmitting information in a form readable by a machine (e.g., a computer), but is not limited to, floppy diskettes, optical disks, Compact Disc, Read-Only Memory (CD-ROMs), and magneto-optical disks, Read-Only Memory (ROMs), Random Access Memory (RAM), Erasable Programmable Read-Only Memory (EPROM), Electrically Erasable Programmable Read-Only Memory (EEPROM), magnetic or optical cards, flash memory, or a tangible, machine-readable storage used in the transmission of information over the Internet via electrical, optical, acoustical or other forms of propagated signals (e.g., carrier waves, infrared signals, digital signals, etc.). Accordingly, the computer-readable medium includes any type of tangible machine-readable medium suitable for storing or transmitting electronic instructions or information in a form readable by a machine (e.g., a computer).

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

In the foregoing specification, a detailed description has been given with reference to specific exemplary embodiments. It will, however, be evident that various modifications and changes may be made thereto without departing from the broader spirit and scope of the invention as set forth in the appended claims. The specification and drawings are, accordingly, to be regarded in an illustrative sense rather than a restrictive sense. Furthermore, the foregoing use of embodiment and other exemplarily language does not necessarily refer to the same embodiment or the same example, but may refer to different and distinct embodiments, as well as potentially the same embodiment.

The following paragraphs provide examples of various ones of the embodiments disclosed herein.

Example 1 is a method for performing a data prefetch to a cache memory, the method performed by a root complex compliant with a Peripheral Component Interconnect Express (PCIe) protocol, the method including receiving, from a device connected to the root complex across a PCIe-compliant link, a data packet; identifying from the received device a memory transaction hint bit; determining a memory transaction from the memory transaction hint bit; and performing an optimization process based, at least in part, on the determined memory transaction.

Example 2 may include the subject matter of example 1 or example 5, further comprising identifying a hint indication bit in the data packet, the hint indication bit indicating that a hint bit is set in the data packet.

Example 3 may include the subject matter of example 2, wherein identifying a hint indication bit in the data packet comprises reading a predetermined bit from a set of reserved bits, and determining that the predetermined bit indicates that a hint bit is set.

Example 4 may include the subject matter of any of examples 1-3, wherein identifying a memory transaction hint bit comprises reading a predetermined bit from a set of reserved bits; and determining that the predetermined bit indicates an imminent memory transaction.

Example 5 may include the subject matter of any of examples 1-4, wherein the received data packet comprises an address translation service request packet.

Example 6 may include the subject matter of example 5, wherein the memory transaction hint bit occupies at a packet location defined by DW0.byte3.bits[2:0].

Example 7 may include the subject matter of any of examples 5-6, further comprising identifying memory address location information from the received data packet, the memory address location information occupying a set of reserved bits defined by DW3, Byte 3, Bits [7:3] and DW3, Byte 2, Bits [2:0].

Example 8 may include the subject matter of any of examples 1-4, wherein the received data packet comprises a zero length write packet.

Example 9 may include the subject matter of example 8, wherein the memory transaction hint bit occupies unused lower address bits of the zero length write data packet.

Example 10 may include the subject matter of any of examples 1-9, wherein performing the optimization process comprises performing a caching behavior optimization process.

Example 11 may include the subject matter of any of examples 1-10, wherein the caching behavior optimization process comprises performing a prefetch of ownership in response to the memory transaction hint indicating a streaming write.

Example 12 may include the subject matter of any of examples 1-10, wherein the caching behavior optimization process comprises performing a prefetch of data and loading the data into a cache memory in response to the memory transaction hint indicating a read transaction.

Example 13 may include the subject matter of any of examples 1-10, wherein the caching behavior optimization process comprises performing a prefetch of ownership and data in response to the memory transaction hint indicating an atomics operation or a cacheable operation.

Example 14 may include the subject matter of any of examples 1-10, wherein performing the optimization process comprises initializing an identified page of memory that comprises predetermined characteristics.

Example 15 may include the subject matter of example 14, wherein initializing the identified page of memory comprises updating metadata stored with the page in memory.

Example 16 may include the subject matter of example 15, wherein updating metadata comprises adding capabilities to the page, the capabilities comprising security features for the memory transaction.

Example 17 is computer program product tangibly embodied on non-transitory computer-readable media, the computer program product comprising code that when executed cause a root complex hardware element to receive, from a device connected to the root complex across a PCIe-compliant link, a data packet; identify from the received device a memory transaction hint bit; determine a memory transaction from the memory transaction hint bit; and perform an optimization process based, at least in part, on the determined memory transaction.

Example 18 may include the subject matter of example 17, wherein the code, when executed, causes the root complex to identify a hint indication bit in the data packet, the hint indication bit indicating that a hint bit is set in the data packet.

Example 19 may include the subject matter of any of examples 17-18, wherein the code, when executed, causes the root complex to identify a memory transaction hint bit by reading a predetermined bit from a set of reserved bits; and determine that the predetermined bit indicates an imminent memory transaction.

Example 20 may include the subject matter of any of examples 17-19, wherein the optimization process comprises performing a caching behavior optimization process.

Example 21 may include the subject matter of example 20, wherein the caching behavior optimization process comprises performing a prefetch of ownership in response to the memory transaction hint indicating a streaming write, performing a prefetch of data and loading the data into a cache memory in response to the memory transaction hint indicating a read transaction, performing a prefetch of ownership and data in response to the memory transaction hint indicating an atomics operation or a cacheable operation.

Example 22 may include the subject matter of any of examples 17-21, the optimization process comprises initializing an identified page of memory that comprises predetermined characteristics.

Example 23 may include the subject matter of example 22, wherein initializing the identified page of memory comprises updating metadata stored with the page in memory.

Example 24 may include the subject matter of example 23, wherein updating metadata comprises adding capabilities to the page, the capabilities comprising security features for the memory transaction.

Example 25 is a method performed at a device connected to a root complex by a Peripheral Component Interconnect Express (PCIe)-compliant link, the method comprising determining an imminent memory transaction using a memory connected to the root complex; setting a hint indication bit in a first reserved bit of a data packet; setting a memory transaction bit in a second reserved bit of the data packet; transmitting the data packet to the root complex across the PCIe-compliant link.

Example 26 may include the subject matter of example 25, and can also include setting other reserved bits to add granularity to the memory transaction indication.

Example 27 is a root complex structure, the root complex structure coupled to a processor and a memory, the root complex structure connected to a plurality of connected devices by a switch fabric compliant with the PCIe protocol. The root complex can include logic implemented at least partially in hardware, to receive, from a device connected to the root complex across a PCIe-compliant link, a data packet; identify from the received device a memory transaction hint bit; determine a memory transaction from the memory transaction hint bit; and perform an optimization process based, at least in part, on the determined memory transaction.

Example 28 may include the subject matter of example 27, wherein the code, when executed, causes the root complex to identify a hint indication bit in the data packet, the hint indication bit indicating that a hint bit is set in the data packet.

Example 29 may include the subject matter of any of examples 27-28, wherein the code, when executed, causes the root complex to identify a memory transaction hint bit by reading a predetermined bit from a set of reserved bits; and determine that the predetermined bit indicates an imminent memory transaction.

Example 30 may include the subject matter of any of examples 27-29, wherein the optimization process comprises performing a caching behavior optimization process.

Example 31 may include the subject matter of example 30, wherein the caching behavior optimization process comprises performing a prefetch of ownership in response to the memory transaction hint indicating a streaming write, performing a prefetch of data and loading the data into a cache memory in response to the memory transaction hint indicating a read transaction, performing a prefetch of ownership and data in response to the memory transaction hint indicating an atomics operation or a cacheable operation.

Example 32 may include the subject matter of any of examples 27-31, the optimization process comprises initializing an identified page of memory that comprises predetermined characteristics.

Example 33 may include the subject matter of example 32, wherein initializing the identified page of memory comprises updating metadata stored with the page in memory.

Example 34 may include the subject matter of example 33, wherein updating metadata comprises adding capabilities to the page, the capabilities comprising security features for the memory transaction.

What is claimed is:

1. An apparatus comprising:
a port, wherein the port is to couple a first device to a second device over an interconnect, and the port comprises protocol circuitry to:
identify attributes of data in memory to be accessed by the first device;
generate an address translation services (ATS) request packet, wherein the ATS request packet comprises a header, the header comprises a transaction hint bit in a first data word of the header and two or more processing hint bits in a fourth data word of the header; and
send the ATS request packet from the first device to the second device, wherein hint information included in the transaction hint bit and the processing hint bits comprise hints for performing cache management at the second device.

2. The apparatus of claim 1, wherein the protocol circuitry is to implement a link on the interconnect according to a Peripheral Component Interconnect Express (PCIe)-based protocol.

3. The apparatus of claim 2, wherein the second device comprises a root complex.

4. The apparatus of claim 3, wherein the first device comprises a PCIe endpoint device.

5. The apparatus of claim 1, wherein the ATS request packet comprises a transaction layer packet (TLP).

6. The apparatus of claim 1, wherein the ATS request packet comprises a PCIe ATS request packet.

7. The apparatus of claim 1, wherein the hint information identifies whether corresponding data is cacheable.

8. The apparatus of claim 7, wherein the packet comprises an address of the corresponding data.

9. The apparatus of claim 1, wherein the transaction hint bit identifies that the processing hint bits are included in the header.

10. The apparatus of claim 1, wherein the transaction hint bit is included in Byte 1 of the first data word of the header.

11. The apparatus of claim 1, wherein the processing hint bits are included in Byte 3 the fourth data word of the header.

12. A method comprising:
identifying attributes of data in memory to be accessed by a first device, wherein the first device is coupled to a second device by a point-to-point interconnect;
generating an address translation services (ATS) request packet, wherein the ATS request packet comprises a header, the header comprises a transaction hint bit in a first data word of the header and two or more processing hint bits in a fourth data word of the header; and sending the ATS request packet to the second device, wherein hint information included in the transaction hint bit and the processing hint bits comprise hints for performing cache management at the first device.

13. A system comprising:

a first device; and a second device coupled to the first device by an interconnect, wherein the interconnect is compliant with a PCIe-based protocol, and the second device comprises protocol circuitry to:

identify attributes of data in memory to be accessed by the second device;

generate an address translation services (ATS) request packet, wherein the ATS request packet comprises a header, the header comprises a transaction hint bit in data word 0 (DW 0) of the header and two or more processing hint bits in data word 3 (DW 3) of the header; and send the ATS request packet to the first device, wherein hint information included in the transaction hint bit and the processing hint bits comprise hints for performing cache management at the second device.

14. The system of claim 13, wherein the first device comprises circuitry to use the hint information in associated with performing cache management at the first device.

15. The system of claim 13, wherein the first device comprises a host processor device.

16. The system of claim 15, wherein the first device comprises a root port.

17. The system of claim 15, wherein the second device comprises a PCIe endpoint device.

18. The system of claim 15, wherein the second device comprises an accelerator device.

19. The system of claim 13, wherein the ATS request packet comprises a PCIe ATS request packet.

20. The system of claim 19, wherein the transaction hint bit is included in Byte 1 of DW 0 of the header and the processing hint bits are included in Byte 3 of DW 3 of the header.

* * * * *